Figure 1:
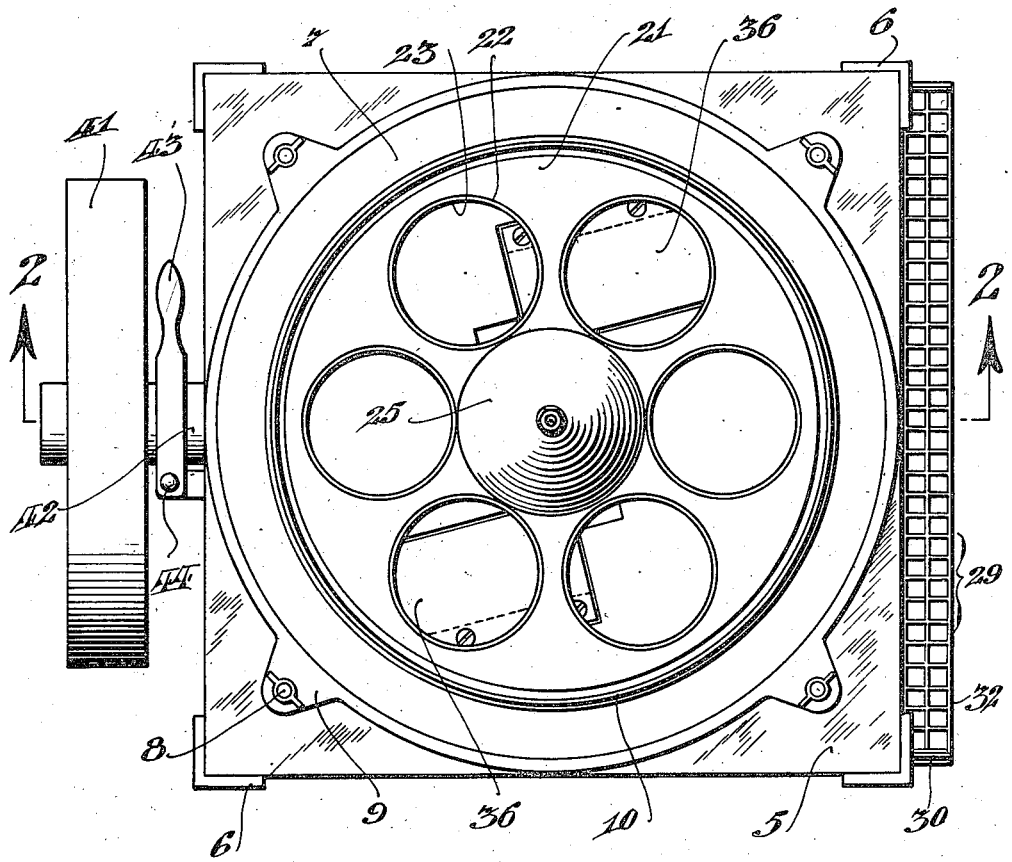

July 10, 1928.  
C. H. AYARS  
VEGETABLE SLICER  
Filed Feb. 12, 1927   4 Sheets-Sheet 1

1,676,241

WITNESSES:

INVENTOR:  
Charles H. Ayars,  
BY  
Joshua R. H. Potts  
ATTORNEY

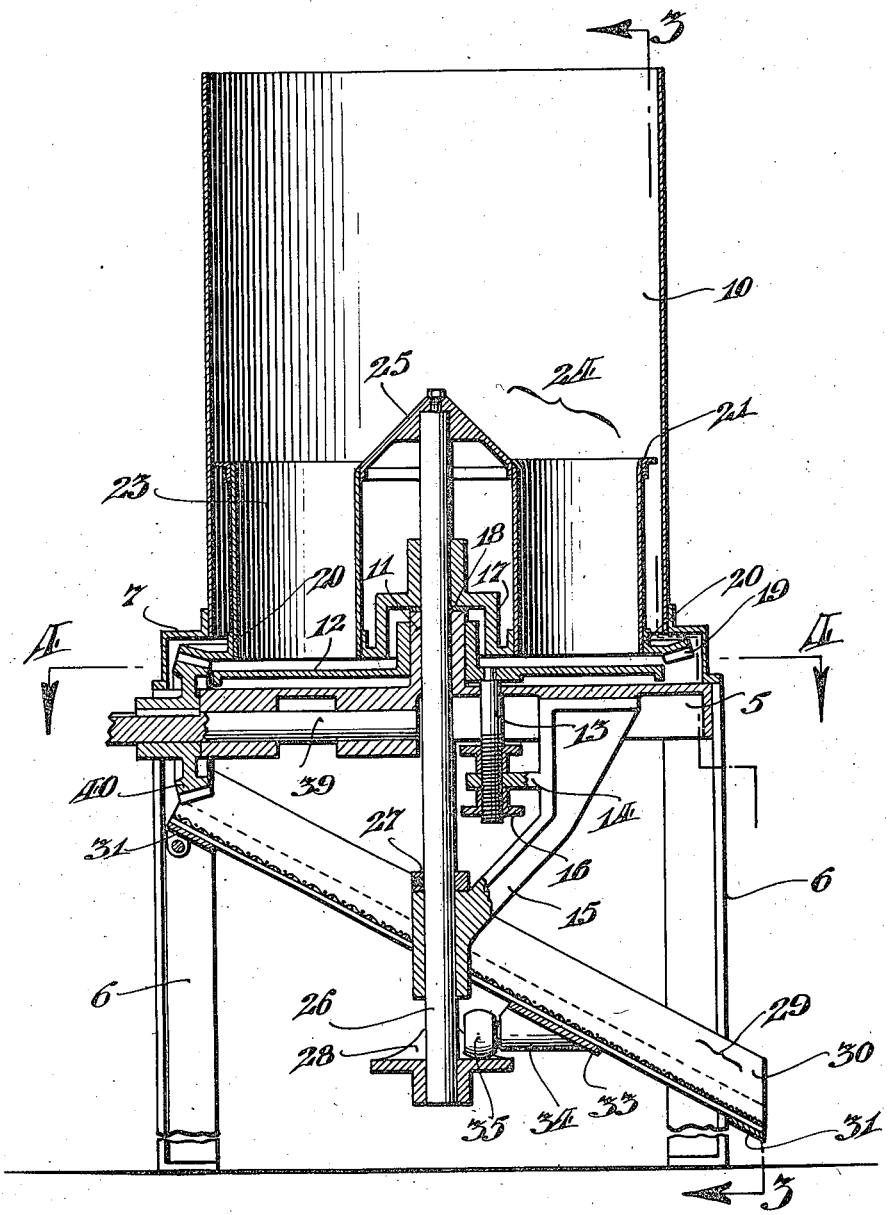

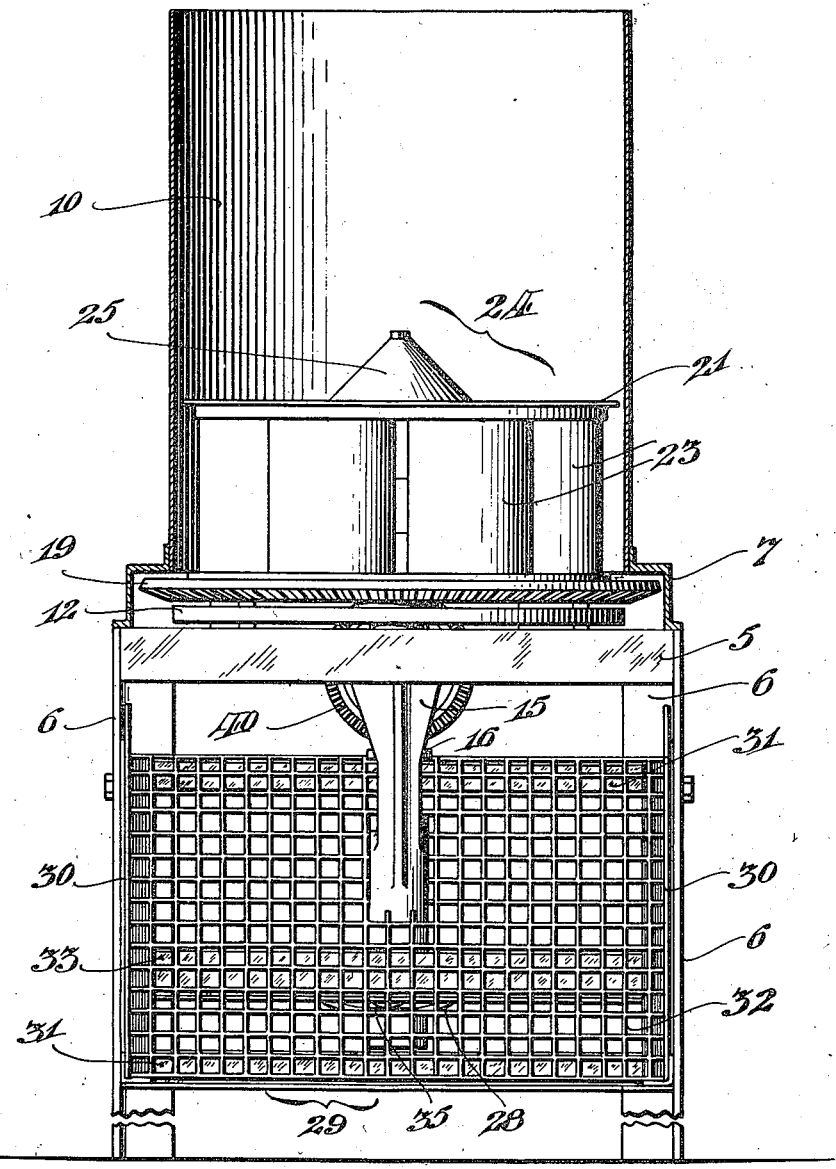

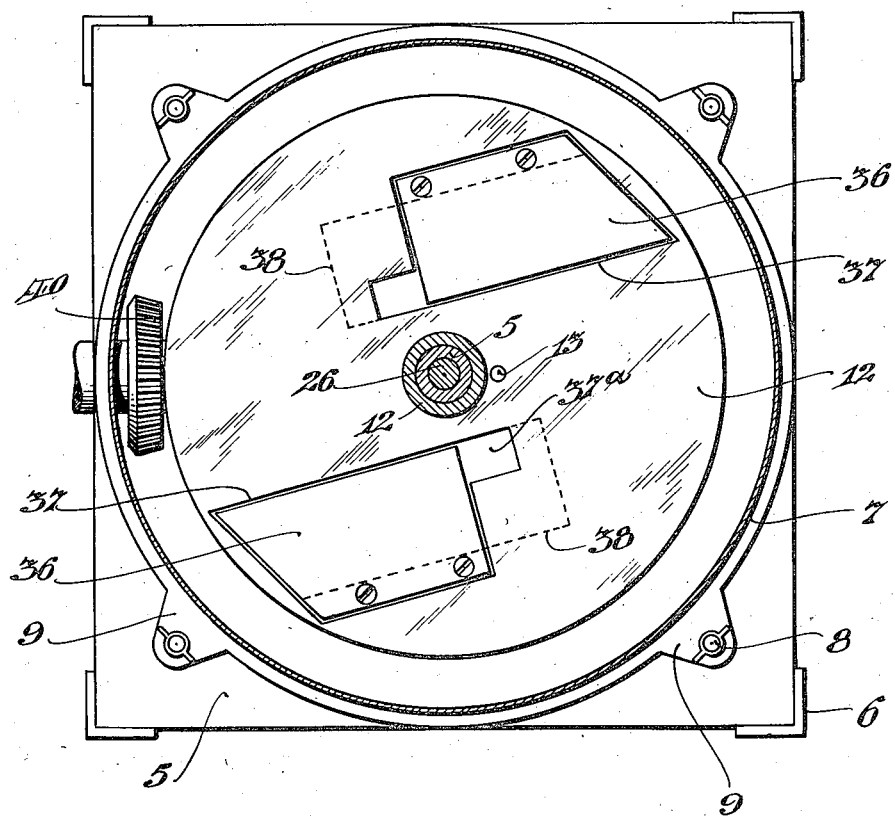

Patented July 10, 1928.

1,676,241

UNITED STATES PATENT OFFICE.

CHARLES H. AYARS, OF SALEM, NEW JERSEY, ASSIGNOR TO AYARS MACHINE COMPANY, OF SALEM, NEW JERSEY, A CORPORATION OF NEW JERSEY.

VEGETABLE SLICER.

Application filed February 12, 1927. Serial No. 167,658.

My invention relates to slicing machines and more particularly to a machine adapted to slice large quantities of vegetables.

In the canning industry, beets and other vegetables are often sliced before being canned and it is necessary to slice large quantities of such vegetables at a time and to separate, from the full sized slices, the small pieces cut from the vegetables at the beginning and ending of the slicing operation.

The objects of my invention are to provide a machine which will handle large quantities of vegetables in a short period of time, slice them uniformly and separate the small pieces from the full slices.

These objects, and other advantageous ends which will be described hereinafter, I attain in the following manner, reference being had to the accompanying drawings in which Figure 1 is a top plan view of a machine embodying my invention, Figure 2 a central sectional view taken on the line 2—2 on Figure 1, Figure 3 a sectional view, partly in full, taken on the line 3—3 on Figure 2, and Figure 4 a plan view taken substantially on the line 4—4 on Figure 2.

Referring now more in detail to the drawings, the main frame of the machine is formed by securing a base plate 5 to suitable legs 6. A receptacle base 7 is suitably secured to base plate 5, as by bolts 8 passing through lugs 9, and a receptacle 10 is secured to the upper edge of base 7.

A hub 11 is formed on base plate 5 and slidably mounted thereon is a bed plate 12 which is raised and lowered, relatively to base plate 5, by means of an adjusting rod 13 passing through a lug 14 of a bracket 15 supported by base plate 5. A nut 16 is threaded on rod 13 at either side of lug 14 so that bed plate 12 may be raised or lowered by means of the upper nut and clamped rigidly in its adjusted position by tightening the lower nut.

A hopper base 17 is supported by hub 11 and is separated therefrom by a bearing washer 18. A ring gear 19 is formed on or secured to the outer edge of hopper base 17 and a plurality of openings 20 are formed between the ring gear and the portion of the hopper base which bears on hub 11. A hopper top 21, having a plurality of openings 22, is disposed above hopper base 17 with the openings in one aligning with the openings in the other. Hopper base 17 and hopper top 21 are connected to one another by means of a plurality of tubes 23, which align with openings 20 and 22, thus forming a hopper 24 having a plurality of pockets.

A conical projection 25 extends upwardly from the inner edges of openings 22 so that material in receptacle 10 will be directed into tubes 23 forming the hopper pockets. A shaft 26 is secured to projection 25 in any suitable manner, as by a tap bolt, and extends downwardly through hopper base 17, hub 11 and bracket 15 and is held against downward movement by means of a stop collar 27 secured to the shaft and bearing against bracket 15. A cam track 28 is fixed to the lower end of shaft 26 while hopper base 17 is keyed thereto so that rotation of the hopper base will cause rotation of shaft 26 and consequently of cam track 28; the shaft being rotatable in hub 11 and bracket 15.

A screen 29 is hinged to two of the legs 6 near their upper ends and slopes downwardly across the space below base plate 5, extending beyond the other pair of legs as plainly shown in Figures 1 and 2. The screen consists of a pair of side bars 30 joined together at each end by bottom bars 31 on which is suitably secured a wire screen 32 having a mesh sufficiently large to allow small pieces of vegetables to pass through. A brace 33, forming an additional bottom bar, is attached to side bars 30 and has secured thereto, or formed thereon, a bracket 34 carrying a roller 35 which engages the faces of cam track 28. It will thus be evident that, as shaft 26 revolves, the cam faces on cam track 28 will alternately raise and lower roller 35 and cause screen 29 to be agitated.

Knives 36 are secured to base plate 5 and extend through openings 37 in bed plate 12 while a larger opening 38, shown in dotted lines on Figure 4, is formed in base plate 5. The main part of openings 37 are slightly larger than knives 36 and have slots 37ª extending from the inner corner of the knife edge in order to prevent material from clogging the knife at this point. Opening 38 is made larger than opening 37 in order that the sliced material may drop freely onto screen 29. The cutting edges of knives 36 are disposed in close proximity to the bottom of hopper 24 so that material in tubes 23, which is supported by bed plate 12, will be forced against the knife edges and sliced by the rotation of the hopper.

A shaft 39 is journaled in base plate 5 and has a pinion 40 keyed thereon and meshing with ring gear 19. A clutch pulley 41 is rotatably mounted on the outer end of shaft 39 and a clutch collar 42 is keyed to the shaft and adapted to be thrown into and out of engagement with pulley 41 by means of a lever 43 pivoted to the base plate at 44.

Assuming that a quantity of beets are to be sliced, they are dumped into receptacle 10, where the lower beets are deflected into tubes 23. The beets in the bottoms of these tubes will be supported by bed plate 12 which is then adjusted, relatively to knives 36, to produce slices of the desired thickness. Power is then applied through pulley 41 and clutch collar 42 so that pinion 40 will rotate hopper 24 and slide the bottom beets around on bed plate 12 into contact with knives 36 so that slices are severed from the beets. These slices will pass under knives 36 and drop through openings 37 and 38 onto screen 29. As shaft 26 is rotated with hopper 24, screen 29 will be agitated vertically, thus causing the slices to move downwardly along the inclined surfaces of the screen while the small pieces fall through the open mesh. From the bottom of the screen the slices may be carried by suitable conveyors to the canning machines or caught in suitable receptacles as may be desired.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A slicing machine including a base plate, a receptacle, a hopper within the receptacle, a bed plate mounted above the base plate, a shaft fixed to the hopper, means to rotate the shaft, a cam track carried by the shaft, an inclined screen hinged beneath the bed plate, and a roller carried by the screen and adapted to be engaged by the cam track and thereby agitate the screen.

2. A slicing machine including a base plate, legs supporting the base plate, a knife mounted on the base plate, a hub formed on the base plate, a hopper carried by the hub, a vertical shaft fixed to the hopper, a cam track carried by the shaft, a screen hinged to the legs, a roller carried by the screen and engaging the cam track, and means to rotate the hopper.

3. A slicing machine including a base plate, legs supporting the base plate, a knife mounted on the base plate, a hub formed on the base plate, a hopper carried by the hub, a bracket depending from the base plate, a vertical shaft fixed to the hopper and rotatable in the base plate and bracket, a collar secured to the shaft and resting on the bracket, a cam track carried by the shaft, a screen hinged to the legs, a roller carried by the screen and engaging the cam track, and means to rotate the hopper.

In testimony whereof I have signed my name to this specification.

CHARLES H. AYARS.